March 13, 1962 R. F. TURBITT 3,025,388
ELECTRIC ARC APPARATUS
Filed Jan. 14, 1960 3 Sheets-Sheet 1

INVENTOR.
RONALD F. TURBITT
BY
Barnwell R. King
ATTORNEY

March 13, 1962  R. F. TURBITT  3,025,388
ELECTRIC ARC APPARATUS
Filed Jan. 14, 1960  3 Sheets-Sheet 2

INVENTOR.
RONALD F. TURBITT
BY Barnwell R. King
ATTORNEY

March 13, 1962 R. F. TURBITT 3,025,388
ELECTRIC ARC APPARATUS
Filed Jan. 14, 1960 3 Sheets-Sheet 3

INVENTOR.
RONALD F. TURBITT
BY
Barnwell P. King
ATTORNEY

United States Patent Office 3,025,388
Patented Mar. 13, 1962

3,025,388
ELECTRIC ARC APPARATUS
Ronald F. Turbitt, Downsview, Ontario, Canada, assignor to Union Carbide Canada Limited, Province of Ontario, Canada, a corporation of Toronto
Filed Jan. 14, 1960, Ser. No. 2,488
6 Claims. (Cl. 219—131)

This invention relates to electric high-intensity or high pressure arcs and more particularly to direct current consumable electrode arc welding.

Consumable electrode welding processes have been used for several years in the fabrication and repair of metal parts by fusion welding. Ordinarily, a power supply is used to provide suitable power to an electric arc which is established between a suitable wire electrode and a workpiece. The heat energy generated primarily within the arc consumes the electrode (which is being fed into the arc at a given controlled rate) and fuses the workpiece, thus permitting a bond to be effected between the workpiece and the electrode filler metal. Contamination of the heated metal is prevented by shielding the arc area with a suitable inert gas, such as argon, gas mixture or fused slag-type composition. Reverse polarity direct current is often preferred to straight polarity, because of the inherent improvement in arc stability and weld penetration obtained using reverse polarity. However, there exists a need for improved welding with straight polarity.

In the past, many modifications have been made to the basic process and apparatus which have provided improvements in the control and versatility of all the various consumable electrode processes. However, there remain certain inherent characteristics and phenomena, both advantageous and disadvantageous, which cannot be adequately controlled and/or explained. For example, completely satisfactory explanations have not been provided for certain arc instabilities, minimum arc length limitations, burnbacks, double arcing, cold starts, droplet metal transfer, etc.

In addition, there are methods which have been used to extend the versatility of the process in general. These include the use of various forms of power supply volt-ampere characteristics, oxygen additions to argon, electrode atom layers, resistive electrode heating, etc., to alter and improve arc characteristics, and use of the more recently developed "short arc" technique to alter the heat energy produced by the arc. For the most part, the significance of such phenomena have not been realized and, as a result, the ultimate potential of the process has not heretofore been exploited.

In regard to the function of the various types and designs of prior power supplies employed for establishing and maintaining a desired electric arc, most if not all have one characteristic in common; namely, they are all inductive. The development of welding power supplies has been one of evolution. Modifications have been made to the original designs throughout the years, but the basic concept has remained essentially unchanged. As a result, the operation of virtually all existing power supplies used for establishing and maintaining an electric arc is such that all exhibit negative power response by virtue of such inductivity.

Consumable electrode arcs under normal operating conditions are self-regulating since, by observation, even though welding conditions are constantly undergoing changes, such changes are subsequently compensated for by the power supply in a manner which ultimately stabilizes the arc. However, due to the inductive nature of prior power supplies, power response is initially negative, eventually becoming positive. Thus, as a change or deviation from a given arc operating condition occurs for any reason, initially the output of the power supply does not change to compensate for such deviation, but changes instead to increase the deviation, with the result that the magnitude of the final deviation was invariably greater than the initial change from the original arc operating condition.

For example, in the operation of the Sigma (shielded-inert-gas-metal) arc welding process using prior power supplies, as the arc length may decrease for some reason from the desired operating condition, additional power is required from the supply in order to increase the electrode consumption (wire burn-off) rate and return the arc to its normal operating condition. Even though additional current was provided, the power output of the supply was instantaneously decreased by virtue of a reduced voltage output equivalent to the change caused by the induced voltage drop across the inductors. Subsequent recovery from this condition is a function of circuit parameters and time. Such instantaneously decreasing voltage is usually disadvantageous since more power is required to sustain the desired arc operating condition. Such additional power could be obtained if the available voltage supplied to the arc were increased or maintained (partially or wholly) at the same time as the initial current increase occurred. This, however, cannot be achieved with an inductive power supply circuit.

For the opposite example, as the arc length increased for some reason from the desired operating condition, less power would be demanded from the supply in order to decrease the electrode consumption rate and return the arc to its normal operating condition. Even though less current were to be provided, the power output of the supply would be instantaneously increased by virtue of an increased voltage output, equal to the voltage induced across the circuit inductors. Such increasing voltage is usually disadvantageous because less power is required to sustain the desired arc operating condition. (The increase in voltage can also cause a burnback to occur by virtue of an accompanying increase in the length of the arc.)

The primary object of this invention is to overcome such difficulty.

Another object is to provide a novel process and means for controlling a high intensity electric arc by the provision of an improved method and apparatus for supplying electric power to any electric high intensity arc, but more particularly to a direct current consumable electrode welding arc.

Another object of the present invention is to provide an arc circuit having a positive power response at the arc.

Another object is to provide a power supply with a positive type of power response which can be controlled by changing one or more of the variable parameters of the power supply circuit.

According to the present invention there is provided a direct current high-intensity arc supply circuit that is selected from the class consisting of one that is effectively purely resistive, and one that is more capacitive than inductive; providing automatic instantaneous positive corrective response to undesirable and otherwise unavoidable changes and deviations in the operation of the arc.

The invention also provides a process of energizing a direct current high intensity arc which comprises automatically applying a positive power response when a deviation or change occurs in the operation of the arc.

The present invention can be used to provide the following principal desirable features:

(1) Permit complete control of arc length while maintaining true "spray-type" arc operation, thereby providing means to prevent the undesirable occurrence of droplet metal transfer below the so-called "transition" currents and voltages using short arc lengths.

(2) Elimination or reduction of arc instabilities by extending and accurately establishing the limits for suitable arc operation using any given types of electrodes, gas shields, etc.

(3) Improved recovery rate from arc instabilities created by mechanical factors such as wire slippage, workpiece irregularities, non-homogeniety of electrodes, and gas, torch movement, etc.

(4) Substantial improvement with respect to prevention of double arcing, burn-backs, droplet transfer, cold starts, spatter and changes in welding conditions during a welding run.

(5) Ability to change with ultimate control the nature or more specifically, the heat input of sigma welding arcs from a low heat input type, to the typically high heat input "spray" type arc. This may be accomplished regardless of electrode type and size.

(6) Provision of complete arc stability and control using pure shielding gases, such as argon, for applications where oxygen additions, for example, were heretofore required to obtain the desired minimum in arc stability. This is particularly desirable in welding stainless steel and high temperature alloys.

(7) Permit the use of straight polarity direct current where reversed polarity has been considered necessary. Complete arc stability is more readily obtained with straight polarity direct current in all of the consumable electrode welding processes.

(8) Provide the desired arc stability and control in all applications where electric high intensity arcs are employed or encountered.

In the drawings, power delivery to the arc P is essentially given by the area under the dynamic volt-ampere characteristic curve (i.e. $P = \int v dI$):

Figure 1:
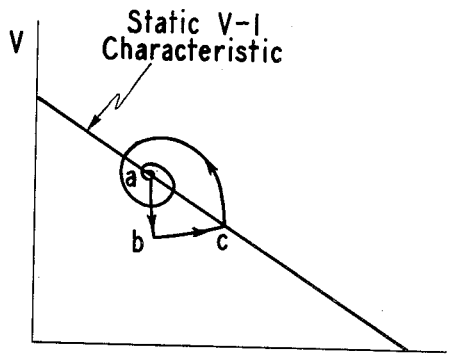
FIG. 1 is a graphical representation of a typical static volt-ampere characteristic curve, with a typical dynamic volt-ampere characteristic curve as it appears during a substantially instantaneous decrease in arc length using the prior art with inductive power supply circuitry; (such curves can be observed using an oscilloscope suitably connected into the arc circuit)

In the operation of a Sigma (shielded inert gas metal) arc according to the prior art as shown in FIG. 1, the arc voltage decreases as a result of decrease in arc length from its normal operating condition at point $a$. Simultaneously, the output voltage of the power supply drops from $a$ to $b$ because of the voltage $E_L = \alpha(di/dt)$ induced across the circuit inductance ($\alpha$) which opposes the power supply output voltage. The current will be essentially unchanged but the rate of change of current, $di/dt$, will have a large positive value. The power supply, instead of providing the desired increase in power output, will actually provide a decrease given by the difference between the power delivered at points $a$ and $b$. Subsequently, the desired overall power increase is provided as the current and voltage output of the power supply increase as a function of the time constant of the electrical circuit to point $c$ where $di/dt$ is zero. As the current decreases from point $c$, $di/dt$ takes on a negative value so that the power supply output voltage increases and the volt-ampere trace subsequently takes on a decreasing spiral-type pattern about point $a$.

Figure 2:
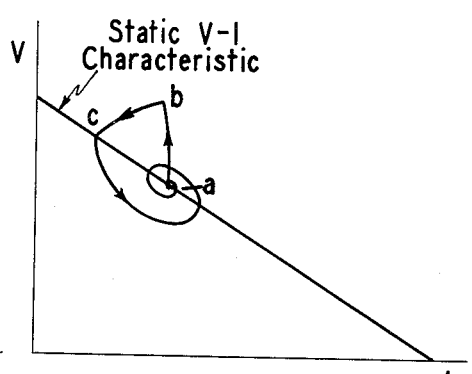
FIG. 2 is a similar representation with substantially instantaneously increasing arc length.

The arc voltage, FIG. 2, according to the prior art, increases with increasing arc length from its normal operating condition at point $a$. Simultaneously, the output voltage of the power supply increases from $a$ to $b$ because of the voltage induced across the circuit inductance which is additive to the power supply output voltage. The current will be essentially unchanged but the rate of change of current, $di/dt$, will have a large negative value. The power supply, instead of providing the desired decrease in power output, will actually provide an increase given by the difference between the power delivered at points $a$ and $b$. Subsequently, the desired overall power decreases as a function of the time constant of the electrical circuit to point $c$ where $di/dt$ is zero. As the current increases from point $c$, $di/dt$ takes on a positive value so that the power supply output voltage decreases and the volt-ampere trace takes on a decreasing spiral-type pattern about point $a$.

The above examples clearly indicate that in the use of prior inductive power supply circuitry, transients introduced by the arc result in negative power response and create regenerative unstable conditions in the power supply output.

Figure 3:
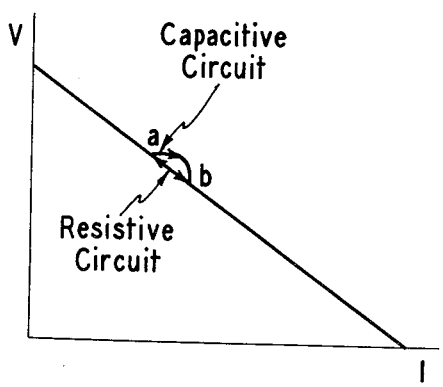
FIGS. 3 and 4 are graphical representations similar to FIGS. 1 and 2, respectively, of characteristic curves resulting from the use of capacitive and resistive circuits of the present invention.

According to the present invention, FIG. 3, as the arc length decreases from a normal operating condition at $a$, instantaneously, the current output of the power supply increases from $a$ to $b$. The output voltage of the power supply will either remain essentially constant or decrease along the static V-I characteristic of the power supply, depending on whether the circuit is effectively capacitive or resistive, respectively. Thus, the present power supply automatically provides the desired increase in power output directly and then returns to the desired operating point.

Figure 4:
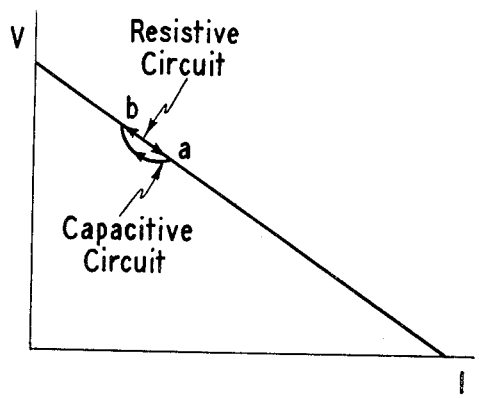

As the arc length, FIG. 4, according to the present invention, increases from a normal operating condition at $a$, instantaneously, the current output of the power supply decreases from $a$ to $b$. The output voltage of the power supply will either remain essentially constant or increase along the static V-I characteristic of the power supply, depending on whether the circuit is effectively capacitive or resistive, respectively. Thus the power supply will provide the desired decrease in power output directly and then return to the desired operating point $a$.

Figure 5:
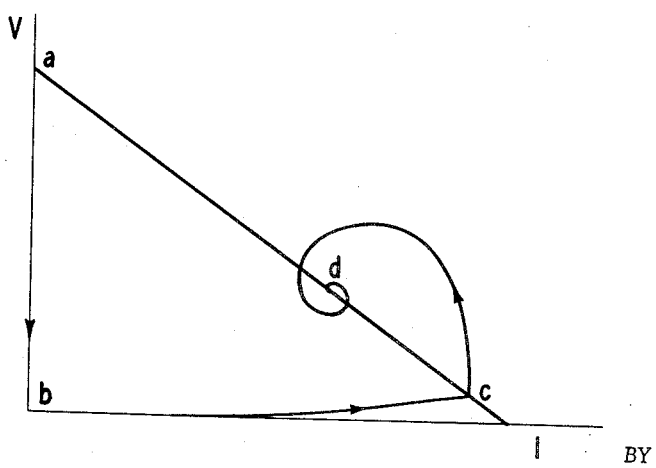
FIG. 5 is a graph of typical static volt-ampere characteristic curve and a dynamic curve on arc initiation of the prior art employing inductive power supply circuitry.

During arc initiation, according to the prior art, FIG. 5, as a short circuit occurs between the electrode and the workpiece, the power supply output voltage drops instantaneously from the open circuit voltage at $a$ to zero voltage at $b$. Then the current increases at a rate determined by the time constant of the circuit. Due to the high rate of change of current $di/dt$, the voltage induced across the circuit inductance is approximately equal to the output voltage of the power supply so that the actual output voltage of the power supply cannot increase significantly until the voltage and current increase to point $c$ where the $di/dt$ is zero. As the current decreases from $c$, the volt-ampere trace takes on a decreasing spiral-type pattern about the desired operating condition at $d$.

Figure 6:
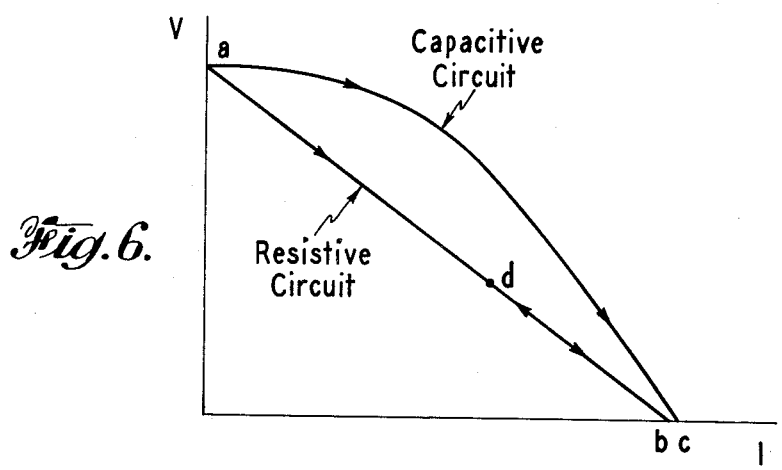
FIG. 6 is characteristic curves of positive power response capacitive and resistive circuits, respectively, of the invention.

During arc initiation, according to the present invention, FIG. 6, as a short circuit occurs between the electrode and the workpiece, the power supply output voltage will drop from the open circuit voltage at $a$ and either follow along the static V-I characteristic to $b$ or be maintained at a higher value along line $a$—$c$, depending upon whether the circuit is effectively resistive or capacitive, respectively. Thus, the initial power output of the power supply which is given by the area beneath the volt-ampere trace is substantially greater than that obtained with an inductive supply and permits the desired arc operating condition at $d$ to be established more directly.

Figure 7:
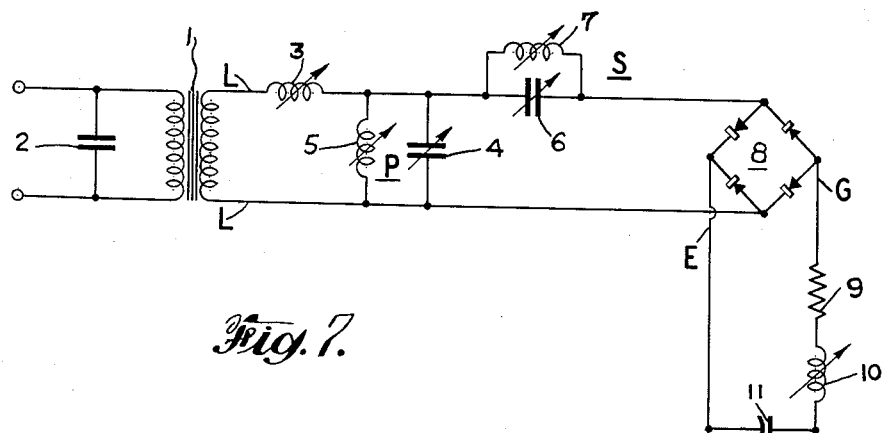
FIG. 7 is a diagram of an arc welding power supply circuit illustrating the invention.

Referring to FIG. 7, there is provided a constant potential welding transformer 1 across the primary of which is connected a power factor compensating condenser 2. In series with the secondary of such transformer there is connected a current limiting variable reactor 3. The inductance of such reactor may be changed either manually or by superimposed D.C. magnetization. An adjustable impedance network P is connected in parallel circuit relation with the output leads L, L of transformer 1. Such impedance consists of an adjustable condenser 4 and an adjustable reactor 5. Condenser 4 may be of constant capacitance. In the case condenser 4 is constant, reactor 5 is variable provided to change the inductance to adjust the power factor of the circuit. An justable impedance S is connected in series with upper lead L. Such impedance includes variable condenser 6 and variable reactor 7 which are parallel-connected. In some cases, impedance S may be omitted. A full-wave rectifier 8 is connected to the circuit to supply rectified, i.e. direct current welding, power.

A resistance 9 and variable reactor 10 are provided in series with output lead G of the rectifier to provide an R-L network.

A filter condenser 11 is across lead E of the rectifier 8 and the R-L network to provide a filter network for the D.C. output of the rectifier 8. Output leads E and G are connected to a workpiece W and welding electrode T to energize a high-intensity welding arc A therebetween.

It was shown that the dynamic characteristics of the arc are dependent upon the internal characteristics of the power supply. To achieve and maintain optimum welding conditions, the internal characteristics of the power supply are changed according to this invention from inductive to capacitive or, to effectively purely resistive, while at the same time maintaining a preselected static volt-ampere characteristic of the power supply to the arc. This can be achieved by the proper setting of one or more of the circuit elements 1, 3, 4, 5, 6, 7, 9, 10 and 11, but primarily through condenser 4.

Resistance 9, reactor 10 and condenser 11 constitute a filter network to regulate the amount of undesirable harmonics in the direct current of the arc. The condenser 11 in addition to its filtering function, adds desirable additional capacitance to the arc supply circuit.

Figure 8:
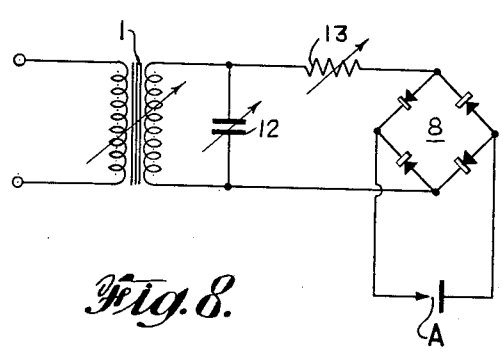
FIG. 8 is a simplified circuit diagram of a modification.

As shown in FIG. 8, an adjustable condenser 12 is connected in parallel relation with the output of a welding transformer 1, which output energizes a full-wave rectifier 8 through a current-limiting resistor 13. The D.C. output of rectifier 8 supplies power to the high intensity arc A. The condenser 12 is adjusted so that the supply circuit is either effectively purely resistive, i.e., wherein inductance is balanced by capacitance, or more capacitive than inductive. As a result, in welding work with such arc, the dynamic volt-ampere supply characteristic of the arc is such that it provides instantaneous positive corrective response to undesirable and otherwise unavoidable changes and deviations in the welding operation.

Figure 9:
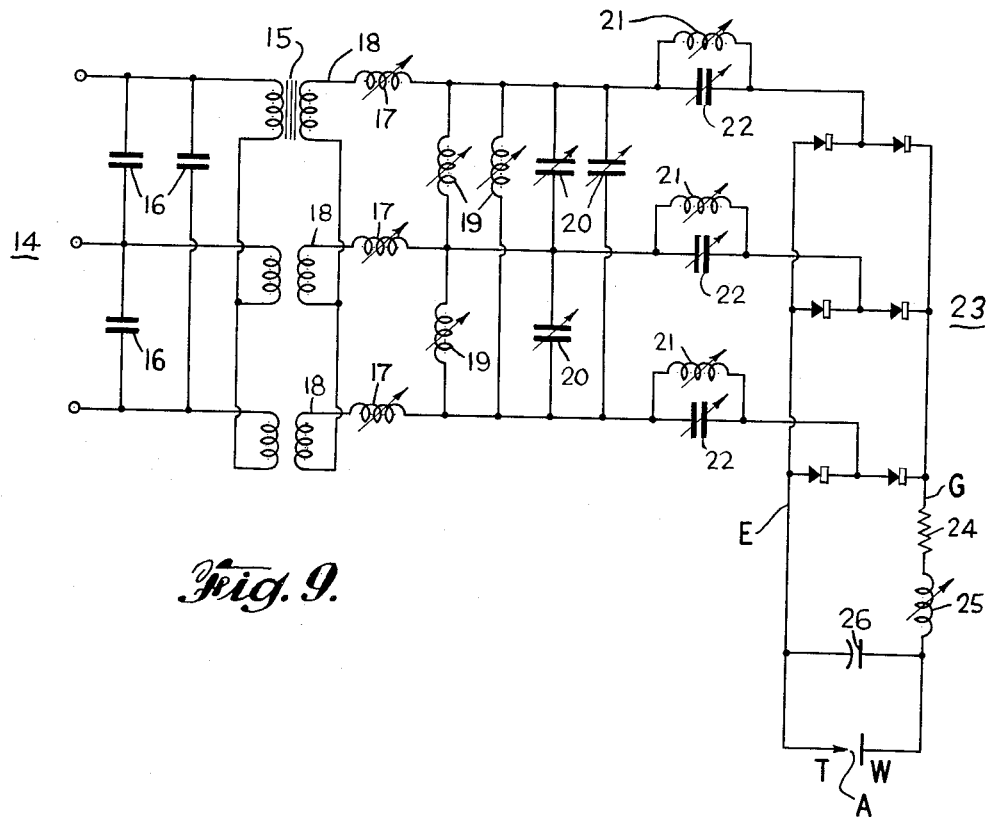
FIG. 9 is a circuit diagram of another modification.

Referring to FIG. 9, a 3 poly-phase power supply circuit 14 is provided comprising a three-phase transformer 15 having power factor compensating condensers 16 connected in parallel with the primaries thereof, and adjustable current-limiting reactors 17 connected in series with the output leads 18 thereof. Power factor control parallel-impedance networks including variable reactors 19 and condensers 20 are connected across such leads, while adjustable power factor series-impedance control networks including reactors 21 and condensers 22 are connected in series with such leads. The latter may be omitted if desired, inasmuch as they represent a refinement. However, they may be used in place of the parallel-connected adjustable impedance network, if desired.

A full-wave rectifier system 23 is connected to the circuit for energization by the 3-phase transformer 15. The output circuit of the rectifier system 23 includes a current limiting resistor 24 and a variable reactor 25 connected in series with lead G which is connected to the workpiece W. Filter condenser 26 is connected in parallel with such output circuit which includes lead E that is connected to the welding arc electrode T. Thus, high intensity arc A is energized by such circuit between electrode T and the workpiece.

The reactive components of the circuit shown in FIG. 9 are adjusted so that the "power factor" at the arc is either unity or leading as distinguished from lagging in accordance with the present invention. As a result, the dynamic power supply volt-ampere characteristic at such arc coincides with the preselected static power supply volt-ampere characteristic, as in the case where a purely resistive circuitry is employed thereby by virtue of the use of either resistive or capacitive circuitries, providing instantaneous positive corrective response to undesirable and unavoidable changes and deviations in the welding operation.

Figure 10:
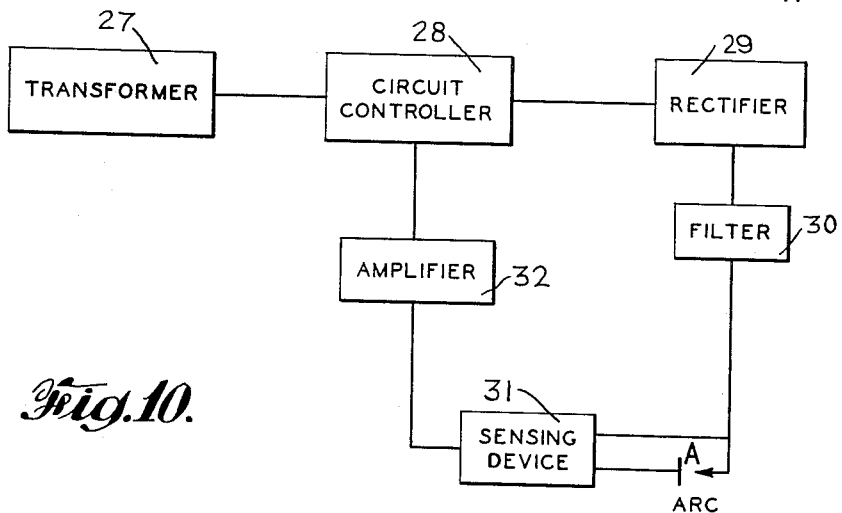
FIG. 10 is a block diagram of a further modification of the invention.

As shown in FIG. 10, transformer 27 is connected to a circuit controller 28 which energizes a rectifier 29. Such rectifier is connected through filter 30 to energize a high intensity arc A. Connected across such arc is a sensing device 31 which operates the circuit controller 28 through amplifier 32. The sensing device operates the circuit controller to adjust automatically the power factor and dynamic power supply volt-ampere characteristic at such arc to stabilize the operation thereof to coincide with a preselected static power supply volt-ampere characteristic.

What is claimed is:

1. An arc circuit for connection to a transformer having a power factor compensating condenser connected across the primary thereof, and a variable reactor connected in series with the secondary thereof, said circuit comprising an adjustable power factor impedance network including parallel connected condenser and a reactor connected in parallel across the output of said transformer, a rectifier connected to such output, and direct current arc circuit leads connected to the output of said rectifier, said power factor network being adjustable to control the "power factor" of the direct current arc circuit at the arc.

2. An arc circuit for connection to a transformer having a power factor compensating condenser connected across the primary thereof, and a variable reactor connected in series with the secondary thereof, said circuit comprising an adjustable power factor parallel-impedance network including parallel connected condenser and a reactor connected in parallel across the output of said transformer, an adjustable power factor series-impedance network including parallel connected reactor and condenser in series with the output of said transformer, a full-wave rectifier connected to such output, and direct current arc circuit leads connected to the output of such rectifier, said networks being adjustable to control the "power factor" of the direct current arc circuit at the arc.

3. An arc circuit for connection to a transformer having a power factor compensating condenser connected across the primary thereof, and a variable reactor connected in series with the secondary thereof, said circuit comprising an adjustable power factor parallel-impedance network including parallel connected condenser and a reactor connected in parallel across the output of said transformer, an adjustable power factor series-impedance network including parallel connected reactor and condenser in series with the output of said transformer, a rectifier connected to such output, a filter network including a resistor and an adjustable inductive choke connected in series with the D.C. output of said rectifier, a filter condenser connected in parallel therewith, and direct current circuit leads connected across such filter network, said filter and power factor networks being adjustable to control the "power factor" of the direct current arc circuit at the arc.

4. A poly-phase power supply for a circuit containing a high intensity arc, comprising a three-phase transformer having power factor compensating condensers connected in parallel with the primaries thereof and adjustable current limiting reactors connected in series with the output leads thereof, power factor control impedance networks connected across said leads, a rectifier system connected to said leads, and a circuit energized by said rectifier system which latter circuit includes such high intensity arc, each of said power factor control networks including a condenser.

5. A three-phase power supply for a circuit containing a high intensity arc, comprising a three-phase transformer having power factor compensating condensers connected in parallel with the primaries thereof and adjustable current limiting reactors connected in series with the output leads thereof, power factor control impedance networks connected across said leads, adjustable power factor impedance control networks connected in series with said leads, a full-wave rectifier system connected to said leads, and an arc circuit connected to the output of said rectifier system, which includes such high intensity arc, each of said power factor control networks including a condenser.

6. A three-phase power supply for a circuit containing a high intensity arc, comprising a three-phase transformer having power factor compensating condensers connected in parallel with the primaries thereof and adjustable current limiting reactors connected in series with the output leads thereof, power factor control impedance networks connected across said leads, adjustable power factor impedance control networks connected in series with said leads, a full-wave rectifier system connected to said leads, and a filter network including an adjustable impedance connected to the output circuit of said rectifier system, which includes such high intensity arc, each of said power factor control networks including a condenser.

References Cited in the file of this patent
UNITED STATES PATENTS

| | | |
|---|---|---|
| 1,959,513 | Weyandt | May 22, 1934 |
| 2,777,973 | Steele et al. | Jan. 15, 1957 |
| 2,873,402 | Needham | Feb. 10, 1959 |
| 2,909,647 | Glenn et al. | Oct. 20, 1959 |
| 2,936,364 | Skinner | May 10, 1960 |